US 6,888,564 B2

(12) United States Patent
Caviedes et al.

(10) Patent No.: US 6,888,564 B2
(45) Date of Patent: May 3, 2005

(54) METHOD AND SYSTEM FOR ESTIMATING SHARPNESS METRICS BASED ON LOCAL EDGE KURTOSIS

(75) Inventors: Jorge E Caviedes, Yorktown Heights, NY (US); Sabri Gurbuz, Central, SC (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 531 days.

(21) Appl. No.: 10/155,209

(22) Filed: May 24, 2002

(65) Prior Publication Data

US 2003/0219172 A1 Nov. 27, 2003

(51) Int. Cl.$^7$ .................... H04N 17/00; H04N 5/213
(52) U.S. Cl. .................. 348/180; 348/606; 348/625; 382/266; 382/286
(58) Field of Search .................. 348/606, 625, 348/627, 180, 403.1, 406.1; 382/266, 286; H04N 17/00, 5/213

(56) References Cited

U.S. PATENT DOCUMENTS

| | | | | |
|---|---|---|---|---|
| 4,745,465 A | * | 5/1988 | Kwon | ................ 358/522 |
| 5,852,475 A | * | 12/1998 | Gupta et al. | ........... 348/606 |
| 6,427,031 B1 | * | 7/2002 | Price | ................ 382/264 |

OTHER PUBLICATIONS

J. Caviedes, No–Reference Metric for a Video Quality Control Loop.
J. Canny, A Computational Approach to Edge Detection, Nov. 1986.
R. Rangayyan, et al Algorithm for the computation of region–based image edge profile acutance, Jan. 1995.
Nien Zhang et al, Image Sharpness Measurement in the Scanning Electron Microscope, Part III, May 27, 1999.
J. Caviedes, Requirements for Objective Image Quality Metrics, 2001.
S. Heijmans, Proceedings of the Society of Photo–Optical Instrumentatio, Feb. 15, 2002.

* cited by examiner

Primary Examiner—Michael H. Lee
(74) Attorney, Agent, or Firm—Edward W. Goodman

(57) ABSTRACT

The present invention relates to a method and system for evaluating the quality of video data without gaining access to the source data. The system is configured to estimate sharpness metrics by detecting edge pixels and enclosing them with 8×8 pixel blocks. For each block, the sharpness according to the Kurtosis of the DCT is computed. The final metric is the average sharpness of the blocks in the edge profile and includes a robust combination of spatial and frequency domain information.

12 Claims, 4 Drawing Sheets

METHOD AND SYSTEM FOR ESTIMATING SHARPNESS METRICS BASED ON LOCAL EDGE KURTOSIS

BACKGROUND OF THE INVENTION

1. Field of the Invention

The present invention relates to a method and system for measuring the sharpness quality of video data and, in particular, to a method and system for assessing the sharpness quality of pictures without referring to the source video data.

2. Description of the Related Art

It is the ultimate goal of video experts to provide most perceptually appealing video images to viewers. One way to determine whether a resulting image quality is good or poor is to ask a panel of viewers to watch certain video sequences and to give their opinions. Another way to analyze video sequences is to provide an automated mechanism to evaluate the excellence or the degradation of the video quality. Various metrics are used, i.e., sharpness, blocking, ringing, clipping, noise, contrast, and temporal impairments to evaluate the overall video quality measure. In particular, the perception of sharpness is related to the clarity of detail and edge definition of an image. The relative sharpness of an image can be measured, in the spatial domain, by the definition of edges in comparison to a reference image; or, in the transformed domain, by the difference in high frequency energy associated with edges and fine details, also with respect to the reference. These are the main two approaches to sharpness measurement, i.e., using either frequency domain information or spatial domain information.

A common approach to measuring the picture quality of video data is to make a comparison between the processed image and the unprocessed source images. However, utilizing the original video as a reference is not applicable to in-service quality monitoring and the development of a continuous quality-control system. Accordingly, the present invention proposes an objective quality assessment using the video sharpness metric to evaluate the objective quality of pictures without utilizing the source data.

SUMMARY OF THE INVENTION

The present invention is directed to an apparatus and method for evaluating the quality of video data without access to the source data by detecting edge pixels and enclosing them with 8×8 pixel blocks; computing the sharpness using the Kurtosis of the DCT for each block; and averaging the sharpness of the blocks in the edge profile.

According to an aspect of the invention, a method of evaluating the sharpness quality of video data without accessing the source data is provided. The method includes the steps of: receiving an input video frame; obtaining an edge image comprised of edge pixels for the input video frame; assigning each edge pixel of a selected portion of the edge image to a center of an 8×8 block; performing a discrete cosine transform (DCT) on the 8×8 block to produce a set of DCT coefficients; normalizing the DCT coefficients of the 8×8 block to obtain a bivariate probability-density function; and, calculating kurtosis of the normalized DCT coefficients to produce a sharpness metric. The method further includes the step of averaging the calculated kurtosis for each the 8×8 block to determine an overall sharpness metric. The edge image is obtained by selecting an edge having a frequency band greater than a predetermined threshold level.

According to another aspect of the invention, an apparatus for evaluating the sharpness quality of video data includes: an edge-detecting means, adapted to receive an input video frame for obtaining an edge image comprised of edge pixels for the input video frame; a segmenting means for receiving the input video frame and assigning each edge pixel of a selected portion of the edge image to an 8×8 block without duplication and with the option of centering the edge pixels on the block; and, a Kurtosis estimator for performing a discrete cosine transform (DCT) on the 8×8 block to produce a set of DCT coefficients, normalizing the DCT coefficients of the 8×8 block to obtain a bivariate probability-density function, and estimating the Kurtosis thereof. The apparatus further includes an adding means for averaging the estimated kurtosis for each the 8×8 block to obtain an overall sharpness metric, wherein the estimated Kurtosis indicates a sharpness quality of the 8×8 block. In the embodiment, the edge detection means is operative to select an edge having a frequency band greater than a predetermined threshold level, and the kurtosis estimator serves to remove a selected DCT coefficient from the DCT coefficients prior to estimating the Kurtosis thereof.

According to a further aspect of the invention, a signal processor, responsive to an input video frame for evaluating the sharpness quality, includes: an input portion, an output portion, and a processing unit coupled between the input and the output portion, the processing unit constructed and adapted to receive the input video frame; obtain an edge image comprised of edge pixels for the input video frame; assign each edge pixel of a selected portion of the edge image to a center of an 8×8 block; perform a discrete cosine transform (DCT) on the 8×8 block to produce a set of DCT coefficients; normalize the DCT coefficients of the 8×8 block to obtain a bivariate probability-density function; and, calculate kurtosis of the normalized DCT coefficients to produce a sharpness metric.

Still another aspect is that the present invention may be realized in a simple, reliable, and inexpensive implementation.

The foregoing and other features and advantages of the invention will be apparent from the following, more detailed description of preferred embodiments as illustrated in the accompanying drawings in which reference characters refer to the same parts throughout the various views. The drawings are not necessarily to scale; instead the emphasis is placed upon illustrating the principles of the invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

In order to facilitate an understanding of this invention, background information relating to the MPEG2 coding is briefly explained. As a person of average skill in the art will appreciate, in general, the MPEG2 coding is performed on an image by dividing the image into macro-blocks of 16×16 pixels, each with a separate quantizer scale value associated therewith. The macro-blocks are further divided into individual blocks of 8×8 pixels. Each 8×8 pixel block is subjected to a discrete cosine transform (DCT) to generate DCT coefficients for each of the 64 frequency bands therein. The DCT coefficients in an 8×8 pixel block are then divided by a corresponding coding parameter, i.e., a quantization weight. The quantization weights for a given 8×8 pixel block are expressed in terms of an 8×8 quantization matrix. Thereafter, additional calculations are affected on the DCT coefficients to take into account, namely the quantizer scale value, among other things, and thereby complete the MPEG2 coding.

Figure 1:
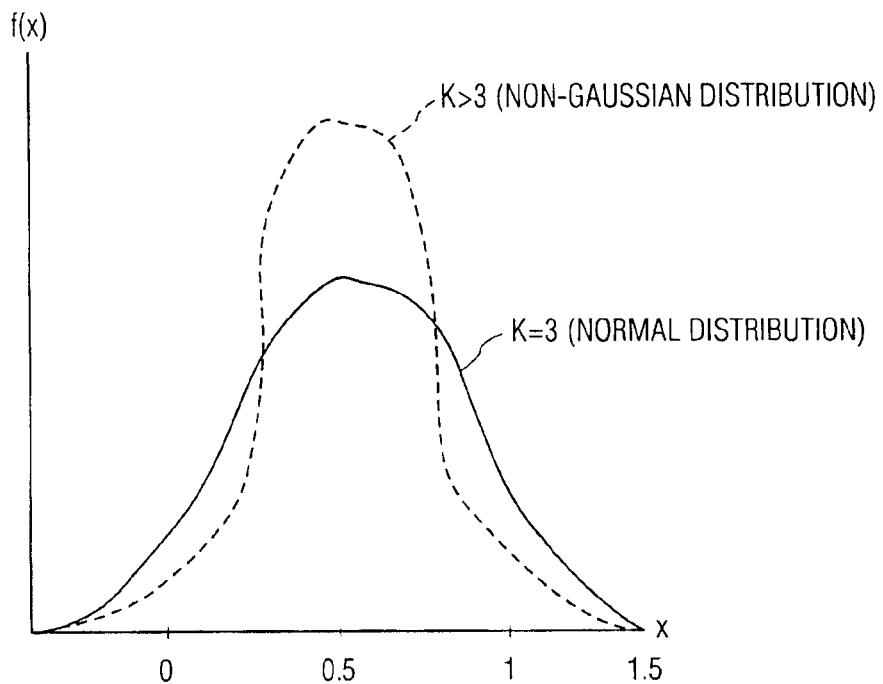
FIG. 1 is a graphical illustration of the Kurtosis for random numbers generated from a normal distribution.

In addition, as a person of average skill in the art will appreciate, a fundamental task in many statistical analyses is to characterize the location and variability of a data set. Also, further characterization of the data includes skewness and kurtosis. Skewness is a measure of symmetry, and a data set, or distribution, is considered symmetric if it looks the same to the left and right of the center point. Kurtosis is a measure of whether the data are peaked or flat relative to a normal distribution. Data sets with high kurtosis tend to have a distinct peak near the mean, then decline rapidly, and have heavy tails. Data sets with low kurtosis tend to have a flat top near the mean rather than a sharp peak. FIG. 1 illustrates a graphical representation of the increase in the peak of probability density functions corresponding to an increase in Kurtosis (K). The kurtosis for a standard normal distribution is three.

As described hereinafter with reference to FIGS. 2–7, the present invention incorporates the above-mentioned statistical analysis and MPEG-coding techniques in evaluating the video quality of pictures without the need for gaining access to the source picture.

Figure 2:
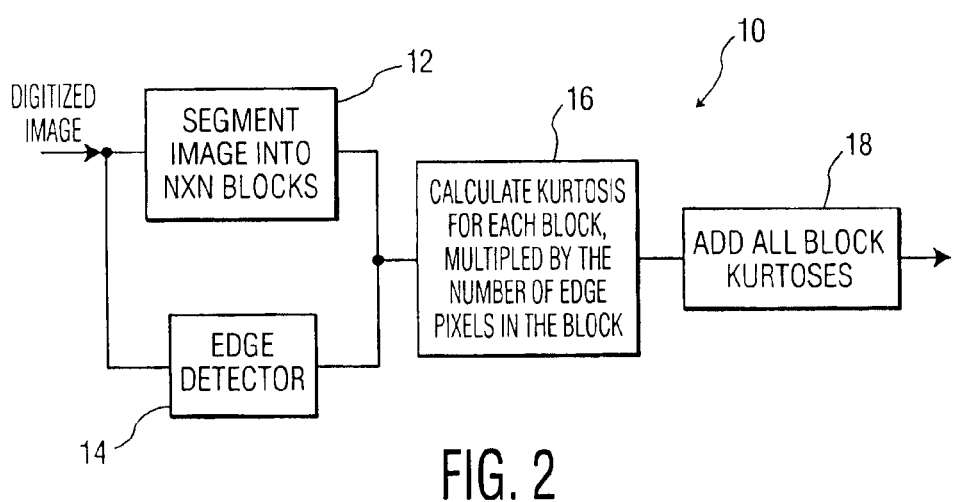
FIG. 2 is a block diagram of an apparatus built according to an exemplary embodiment of the present invention.

FIG. 2 is a simplified block diagram of the inventive sharpness metric detector 10 comprising a segment module 12, an edge detector 14, a K estimator 16, and an adder 18 for estimating the quality of the picture that has been gathered from the DCT coefficients without the need for gaining access to the source picture. As shown in FIG. 2, the digital image data, after being converted from analog video data, is forwarded to the sharpness metric detector 10, which may represent, i.e., a microprocessor, a central processing unit, a computer, a circuit card, an application-specific integrated circuit (ASICs).

Figure 3:
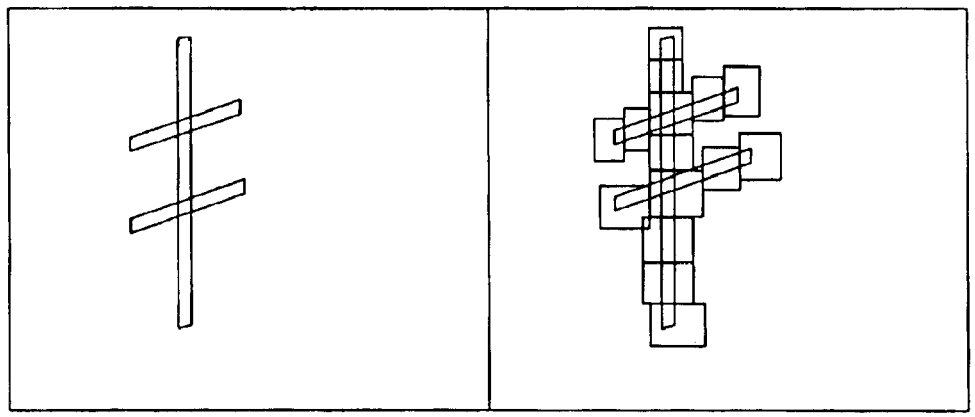
FIG. 3 shows the operation steps of the detecting edge pixels to create edge profiles in accordance with the present invention.

Referring to FIG. 3, the edge detector 14 is configured to create the edge profile of each input video frame. FIG. 3 shows the original and edge images, and examples of possible block assignments. All edges whose frequency values are greater than a predetermined threshold are detected. Note that the edge pixel values at the center of the transition from high to low, or vice versa, indicates the center of the transition. Mathematically, the center corresponds to the maximum of the gradient (or first derivative of the transition values) and the null point of the second derivative. Detecting edges in a video frame is well known in the art that can be performed in a variety of ways. See for example, J. Canny, A Computational Approach to Edge Detection, *IEEE Transactions on Pattern Analysis and Machine Intelligence*, Vol. PAMI-8, No. 6, November 1986, the content of which is hereby incorporated by reference. This article provides a detector that is capable of detecting edges while excluding weak edges often associated with MPEG-blocking artifacts and low-level noise.

Meanwhile, the segment module 12 subjects the input digital-image data into 8×8 pixel blocks and assigns each edge pixel to an 8×8 block. The block assignment may be done centering the edge pixels on the block, but it must be done without assigning an edge pixel to more than one block. The simplest embodiment uses the MPEG grid, i.e. 8×8 size with origin at (0,0). Then, the K estimator 16 subjects each 8×8 block containing an edge image to DCT processing in order to generate DCT coefficients for AC frequency bands on each block of the edge profile. Thus, for a given 2-D image region, i.e., an 8×8 pixel block, the corresponding 2-D coefficients, F(u, v), are obtained. F(u, v) is then normalized, after excluding F(0,0), to form the bivariate probability-density function (PDF), p(u, v). Finally, the K estimator 16 computes the 2-D kurtosis on each block having the edge frequency profile of image blocks centered at edge pixel locations, as described mathematically hereinafter.

Let D(u,v) be an 8×8 block DCT coefficient matrix. The distribution of the coefficients, excluding D(0,0), can be normalized to form a legitimate bivariate probability-density function (PDF), p(x,y), as follows:

$$\Sigma\Sigma p(x,y)=1 \quad (1)$$

As a person of average skill in the art will appreciate, the classical measure of the non-gaussianity of a random variable, i.e. X, is kurtosis. Kurtosis is a measure of the departure of a probability distribution from the gaussian (normal) shape. As shown in FIG. 1, the kurtosis measure is zero for a Gaussian variable, and greater than zero for most non-gaussian random variables. Note that there are non-gaussian random variables that have zero kurtosis, but they can be considered rare.

For a given random variable x with the mean $\mu_x$, the kurtosis is defined by:

$$kurt(x)=\beta_2=m_4/m_2^2, \quad (2)$$

wherein $m_4$ and $m_2$ represent the fourth and second central moments, respectively; and, wherein the $k^{th}$ central moment is defined by:

$$m_k=E[(X-\mu_x)^k]=\Sigma(x-\mu_x)^k p(x), \quad (3)$$

where E denotes the probability expectation or the mean value of a random variable.

$$p(x) = \sum_y p(x, y), \quad (4)$$

where E denotes the probability expectation or the mean value of a random variable.

Moreover, if $x_1$ and $x_2$ are two independent random variables, then kurtosis has the following linearity property:

$$\beta_2(x_1+x_2)=\beta_2(x_1)+\beta_2(x_2), \quad (5)$$

$$\beta_2(\alpha.x_1)=\alpha^4\beta_2(x_1), \quad (6)$$

where $\alpha$ is a scalar.

Furthermore, let W be a p-dimensional random vector (i.e. $W=[w_1,w_2, \ldots w_p]$) with finite moments up to the fourth moments, and $\mu$ and $\Gamma$ be the mean vector and covariance matrix of W, respectively. Then, the p-dimensional kurtosis can be represented as:

$$\beta_{2,p}=E[(W-\mu)^T\Gamma^{-1}(W-\mu)]^2, \quad (7)$$

where T denotes the transpose of a vector.

Finally, using the above equation (7) and with p=2, a random vector $\bar{W}=[X,Y]^T$ is applied to the Fourier transform of the entire image. This result can be represented as follows:

$$\beta_{2,2}=[\gamma_{4,0}+\gamma_{0,4}+2\gamma_{2,2}+4\rho(\rho\gamma_{2,2}-\gamma_{1,3}-\gamma_{3,1})]/(1-\rho^2)^2, \quad (8)$$

where $$\gamma_{k,l} = \frac{\sum_{i=0}^{n}\sum_{j=0}^{m}(x_i-\mu_x)^k(y_i-\mu_y)^l p(x_i, y_i)}{\left(\sum_{i=0}^{n}(x_i-\mu_x)^2 p(x_i)\right)^{k/2}\left(\sum_{j=0}^{m}(y_i-\mu_y)^2 p(y_i)\right)^{l/2}} \quad (9)$$

$$\sigma_{xy}^2=E[(X-\mu_x)(Y-\mu_y)] \quad (10),$$

and $$\rho=\sigma_{xy}^2/[\sigma_x\sigma_y]. \quad (11)$$

Note that the 2-D kurtosis is a sharpness indicator for the entire m×n image, or any region within. However, there is a very important difference found according to the present invention. While the 2-D kurtosis of the overall image decreases when the image becomes sharper, the kurtosis of the 8×8 blocks increases with sharpness. This effect is the result of the local frequency distribution near the edges. Thus, for a given 2-D image region f(X,Y), i.e. an 8×8 pixel block, where m, n=0,1, . . . 7, the corresponding 2-D DCT coefficients F(u,v) can be obtained, where u and v are the spatial frequencies. F(u,v) is then normalized, after excluding F(0,0), to form the bi-variate probability-density function, p(u,v).

Figure 4:
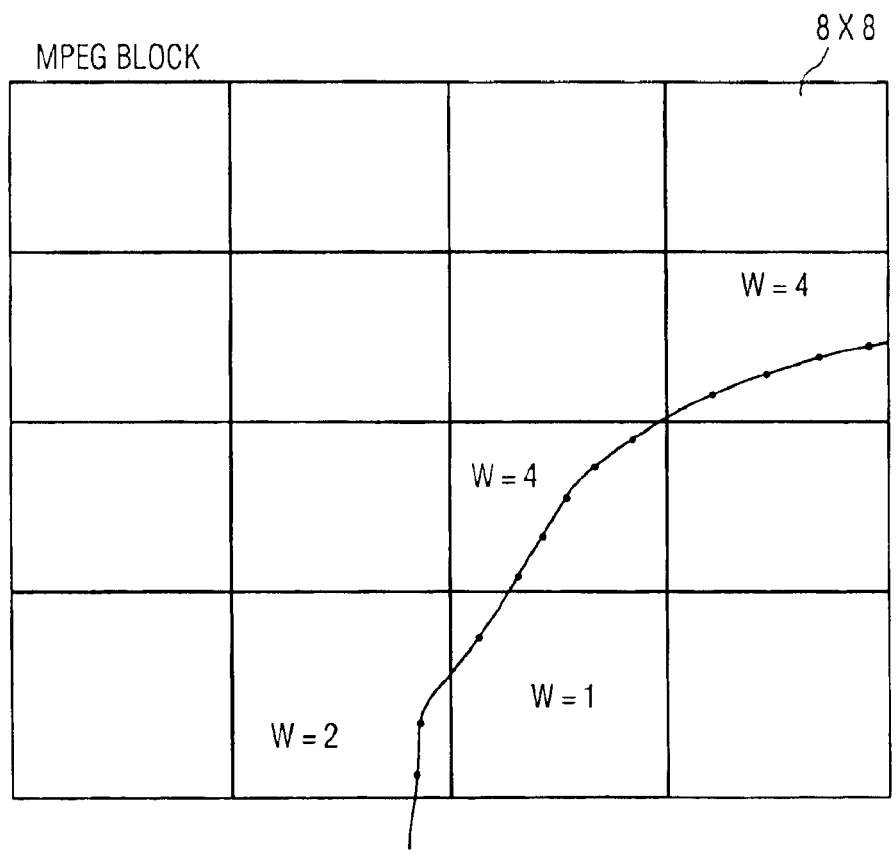
FIG. 4 is a flow chart illustrating the operation steps of the video quality in accordance with the present invention.

Referring to FIG. 4, the kurtosis of each 8×8 DCT block having an edge profile of image blocks centered at edge pixel locations is calculated according to Equation (8). Then, for each block of 8×8 pixels with the edge profile therein, the number of pixels that cross the edge frequency profile, w, is determined. Thereafter, the value of 2-D kurtosis, K, of 8×8 block is multiplied by the corresponding w. Note that the value of 2-D kurtosis on each block with the edge profile (w×K) indicates the local kurtosis of the edge frequency profile and therefore it represents a local measure of sharpness. As such, the average value can indicate the sharpness measure for the whole frame. Accordingly, after computing 2-D kurtosis according to Equation (8) on each block with the edge profile, the adder 18 averages the kurtosis over all 8×8 blocks having the edge profile, by adding (w×K) for each block with the edge profile divided by the total number of blocks with the edge profiles. Furthermore, the average can be determined per frame or image, or as a running average over a certain time window to obtain different levels of sharpness measurement, which varies depending on the application.

Figure 5:
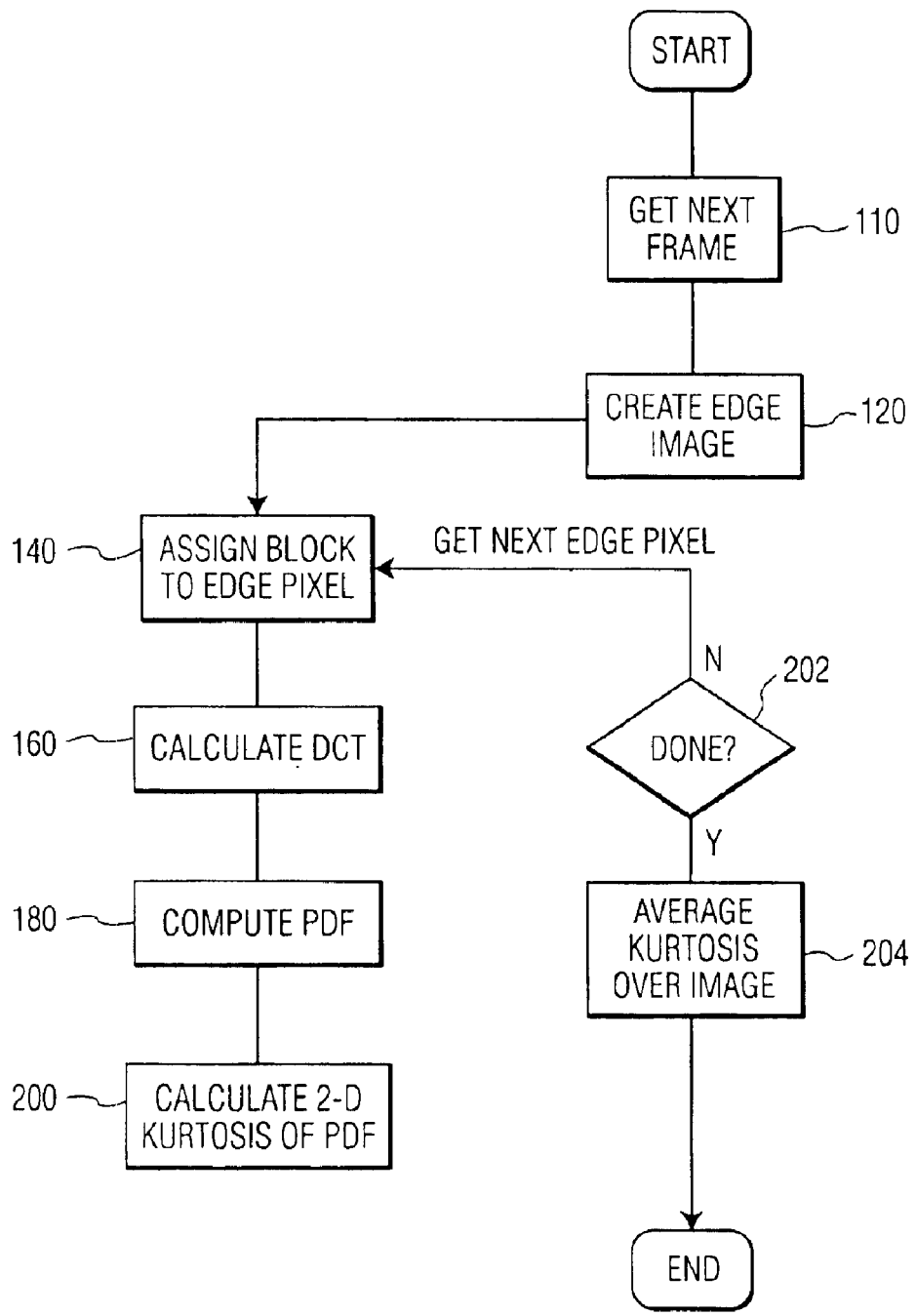
FIG. 5 is a flow chart illustrating the operation steps of the video quality in accordance with the present invention.

FIG. 5 is a flow diagram depicting the operation steps of evaluating video quality in accordance with the embodiment of the present invention. It should be noted that the processing and decision blocks can represent steps performed by functionally equivalent circuits, such as a digital signal-processor circuit or an application-specific integrated circuit (ASIC). The flow diagrams do not depict the syntax of any particular programming language. Rather, the flow diagrams illustrate the functional information that a person of ordinary skill in the art requires to fabricate circuits or to generate computer software to perform the processing required of the particular apparatus.

Upon receiving the input video frame in step 110, an edge image for each input video frame is created using the edge detector 14 of FIG. 2 in step 120. Then, each edge pixel is assigned to an 8×8 block using the segment module 12 of FIG. 2 in step 140. The 8×8 DCT, F(u,v), is performed in step 160, and normalized to obtain the PDF, p(u,v), in step 180. Thereafter, the 2-D kurtosis calculation is performed on each block of the edge-frequency profile using the K estimator 16 of FIG. 2 in step 200. If all edge pixels have been processed in step 202, the kurtoses are averaged over all 8×8 blocks in step 204 using the adder 18 of FIG. 2.

Figure 6:
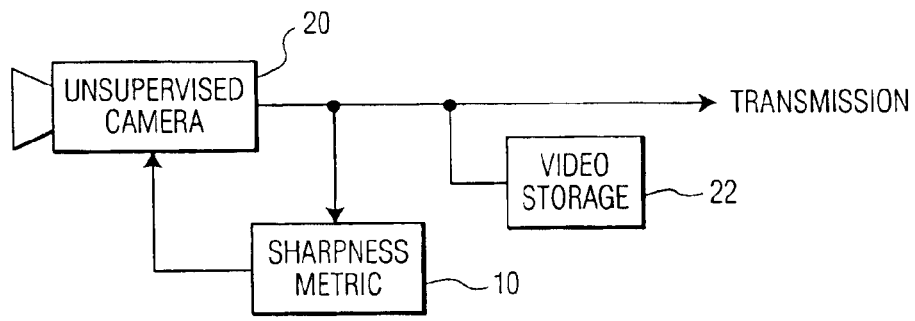
FIG. 6 is a simplified block diagram of the applicable embodiment according to an exemplary embodiment of the present invention.
Figure 7:
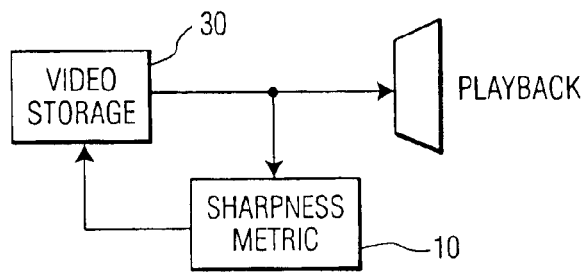
FIG. 7 is a simplified block diagram of the applicable embodiment according to another exemplary embodiment of the present invention; and, FIG. 8 is a simplified block diagram of the applicable embodiment according to another exemplary embodiment of the present invention.
Figure 8:
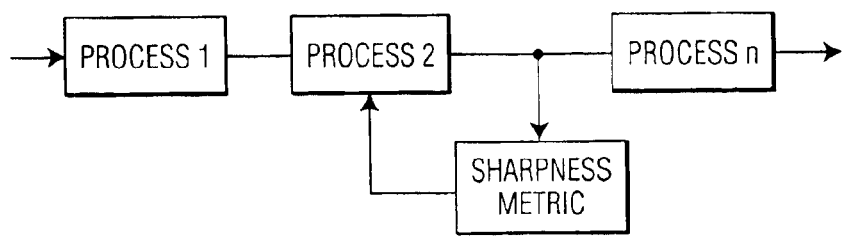

As is apparent from the foregoing, the present invention has an advantage in that the sharpness metric system 10 uses the kurtosis of small regions enclosing the image edges, thus taking into account frequency characteristics as well as local spatial information. The resulting sharpness metric is not content-dependent, and by focusing on local kurtosis in edge regions, the present invention can avoid noise. It should be noted that many video applications, such as the focus control of the video imager, video-processing algorithm development, real-time video quality monitoring/control, and real-time quality control of the networked video can benefit from the teachings of the present invention. As the metric have a simple and generic methodology, it may serve as a real-time quality observer with three advantages. It has 1) systematic and consistent sharpness quality control, 2) is very inexpensive to employ and feasible for many real-time applications without human intervention, and 3) saves the human quality observers from many boring tasks. For example, FIGS. 6–8 are simplified block diagrams whereto the embodiment of the present invention is applied. Referring to FIG. 6, the sharpness detector 10 may be coupled to any type of video-generating device, such as an unsupervised camera or other video equipment that is capable of generating video data based on a particular image. Referring to FIG. 7, the video storage 22 may be any conventional video-storage medium known in this art. Referring to FIG. 8, the sharpness-metric detector may be implemented in video-capture operations, such as detection, coding, transmission, enhancement, etc., such that properly-selected monitoring and control points can be used to install sharpness-control loops of different scopes.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for evaluating the sharpness quality of video data, the method comprising the steps of:
    (a) receiving an input video frame;
    (b) obtaining an edge image comprised of edge pixels for said input video frame;
    (c) assigning each edge pixel of a selected portion of said edge image to a center of an 8×8 block;
    (d) performing a discrete cosine transform (DCT) on said 8×8 block to produce a set of DCT coefficients;
    (e) normalizing said DCT coefficients of said 8×8 block to obtain a bivariate probability-density function; and,
    (f) calculating kurtosis of said normalized DCT coefficients to produce a sharpness metric.

2. The method of claim 1, further comprising the step of repeating said steps (c) through (f) for each said 8×8 block containing said edge pixels.

3. The method of claim 2, further comprising the step of averaging said calculated kurtosis for each said 8×8 block to determine an overall sharpness metric.

4. The method of claim 1, wherein said step (b) of obtaining said edge image involves selecting an edge having a frequency band greater than a predetermined threshold level.

5. The method of claim 1, wherein said step (d) of determining said DCT coefficients further comprises the step of removing a predetermined DCT coefficient from the DCT coefficients.

6. An apparatus for evaluating the sharpness quality of video data, comprising: an edge-detecting means, adapted to receive an input video frame for obtaining an edge image comprised of edge pixels for said input video frame;
    a segmenting means for receiving said input video frame and assigning each edge pixel of a selected portion of said edge image to an 8×8 block without duplication and with the option of centering the edge pixels on the block; and,
    a Kurtosis estimator for performing a discrete cosine transform (DCT) on said 8×8 block to produce a set of DCT coefficients, normalizing said DCT coefficients of said 8×8 block to obtain a bivariate probability-density function, and estimating the Kurtosis thereof.

7. The apparatus of claim 6, wherein said each edge pixel of the selected portion of said edge image is assigned to a center of said 8×8 block.

8. The apparatus of claim 6, further comprising an adding means for averaging said estimated kurtosis for each said 8×8 block to obtain an overall sharpness metric.

9. The apparatus of claim 6, wherein said estimated Kurtosis indicates a sharpness quality of said 8×8 block.

10. The apparatus of claim 6, wherein said edge detection means is operative to select an edge having a frequency band greater than a predetermined threshold level.

11. The method of claim 6, wherein said kurtosis estimator removes a selected DCT coefficient from the DCT coefficients prior to estimating the Kurtosis thereof.

12. A signal processor, responsive to an input video frame for evaluating the sharpness quality, comprising:
    an input portion, an output portion, and a processing unit coupled between said input and said output portion, said processing unit constructed and adapted to receive said input video frame; obtain an edge image comprised of edge pixels for said input video frame; assign each edge pixel of a selected portion of said edge image to a center of an 8×8 block; perform a discrete cosine transform (DCT) on said 8×8 block to produce a set of DCT coefficients; normalize said DCT coefficients of said 8×8 block to obtain a bivariate probability-density function; and, calculate kurtosis of said normalized DCT coefficients to produce a sharpness metric.

* * * * *